United States Patent
Huston et al.

(10) Patent No.: US 8,056,919 B1
(45) Date of Patent: Nov. 15, 2011

(54) TOW BAR AND LEG LATCHING MECHANISM THEREFOR

(75) Inventors: James Huston, Yankton, SD (US); David Merchant, Lincoln, NE (US); Steven Goodman, Pender, NE (US); Leslie Roeber, Emerson, NE (US); Neil Wagner, Winsive, NE (US)

(73) Assignee: Automatic Equipment Manufacturing Company, Pender, NE (US)

( * ) Notice: Subject to any disclaimer, the term of this patent is extended or adjusted under 35 U.S.C. 154(b) by 0 days.

(21) Appl. No.: 13/134,281

(22) Filed: Jun. 3, 2011

Related U.S. Application Data (63) Continuation of application No. 10/957,890, filed on Oct. 4, 2004, now Pat. No. 7,104,555.

(51) Int. Cl.
*B60D 1/54* (2006.01)
(52) U.S. Cl. .................. 280/493; 280/482; 280/491.2
(58) Field of Classification Search .................. 280/493, 280/482, 491.2
See application file for complete search history.

(56) References Cited

U.S. PATENT DOCUMENTS

| | | | |
|---|---|---|---|
| 2,488,805 A * | 11/1949 | Clark et al. ............ | 280/477 |
| 3,947,062 A | 3/1976 | Pierce | |
| 4,856,805 A | 8/1989 | Davis | |
| 4,861,061 A | 8/1989 | Frantz | |
| 5,071,153 A | 12/1991 | Duncan | |
| 5,224,960 A | 7/1993 | Duncan | |
| 5,232,240 A | 8/1993 | Johnson | |
| 5,516,140 A | 5/1996 | Hinte | |
| RE35,482 E | 3/1997 | Johnson | |
| 5,765,851 A | 6/1998 | Parent | |
| 5,915,715 A | 6/1999 | Ford | |
| 5,957,477 A | 9/1999 | Ensz | |
| 6,168,182 B1 | 1/2001 | Ford | |
| 6,352,278 B1 | 3/2002 | Solberg | |
| 6,755,589 B2 | 6/2004 | Friesen | |
| 6,957,824 B2 | 10/2005 | Klar | |
| 7,029,021 B2 | 4/2006 | Klar | |
| 7,390,007 B2 | 6/2008 | Helms | |
| 7,461,855 B2 | 12/2008 | Klar | |
| D610,953 S | 3/2010 | Eckhart | |
| 7,837,216 B1 | 11/2010 | Greaves | |
| 2006/0249926 A1 | 11/2006 | Smith | |
| 2007/0114761 A1 | 5/2007 | Klar | |

* cited by examiner

*Primary Examiner* — Joanne Silbermann
*Assistant Examiner* — Michael Stabley
(74) *Attorney, Agent, or Firm* — Donald R. Schoonover

(57) ABSTRACT

A tow bar having telescoping tow bar legs connected to a head member which is structured to be releasably securable to a towing hitch member of a towing vehicle; aft leg connector mechanisms structured to releasably connect the tow bar legs to a towed vehicle; and a latching mechanism, including latching portions structured to releasably retain the tow bar legs in a stored configuration, and locking portions structured to releasable lock the tow bar legs in a deployed configuration.

10 Claims, 5 Drawing Sheets

TOW BAR AND LEG LATCHING MECHANISM THEREFOR

CROSS REFERENCE TO RELATED APPLICATION

This application is a continuation of application Ser. No. 10/957,890, filed Oct. 4, 2004, now U.S. Pat. No. 7,104,555, issued Sep. 12, 2006.

BACKGROUND OF THE INVENTION

1. Field of the Invention

The present invention relates to towing accessories and more particularly without limitation, to tow bars for connecting a towing vehicle to a vehicle to be towed.

2. Description of the Related Art

A tow bar is generally used for connecting a towing hitch arrangement of a towing vehicle to a towing hitch arrangement of a vehicle to be towed, sometimes referred to herein as a towed vehicle. For tow bar applications wherein heavy, massive equipment will be moved a relatively short distance, such as where an airliner is to be backed away from a terminal for example, the tow bar generally has only one tow bar leg. For such applications, one end of the tow bar leg may be connected to the front end of the vehicle to be moved and the other end of the tow bar leg connected to the front end of the moving vehicle so the operator of the towing vehicle can face the vehicle to be moved and can carefully observe the response of the towed vehicle as it is being slowly moved by the moving vehicle.

For applications wherein the towed vehicle will be towed at speeds other than very slow speeds, the tow bar generally has two tow bar legs, the front end of each tow bar leg separately and pivotally connected to a head element of the tow bar. In use, the front ends of the tow bar legs form the apex of an isosceles triangle and the rear ends of the tow bar legs are spaced apart to form the sides of the isosceles triangle. The triangular configuration is intended to cause the towed vehicle to closely track the towing vehicle, both along straightaways and around corners.

Tow bars must generally be designed to accommodate variations in attitude that inherently occur between the towing and towed vehicles, which variations are constantly and continuously changing during use. One such variation in attitude between the vehicles occurs when the instantaneous elevation of the towing vehicle differs from the instantaneous elevation of the towed vehicle. A related variation in longitudinal attitude between the vehicles occurs when the instantaneous ascent/descent orientation of the towing vehicle differs from the instantaneous ascent/descent orientation of the towed vehicle. Both of these related variations in attitude can be accommodated by apparatus designed to accommodate relative rotations between the towing and towed vehicles about a transverse, horizontal axis, sometimes referred to as the "pitch" axis, see the "z"-axis in FIG. 1.

Another such variation in attitude between the vehicles occurs when the instantaneous horizontal direction in which the towing vehicle is traveling differs from the instantaneous horizontal direction in which the towed vehicle is traveling, such as when the towed vehicle is being pulled around an unbanked corner for example. This situation, sometimes referred to as "yaw", can be accommodated by apparatus designed to accommodate relative rotations between the towing and towed vehicles about a vertical axis, see the "y"-axis in FIG. 1.

Finally, another such variation in attitude between the vehicles occurs when the instantaneous transverse tilt of the towing vehicle differs from the instantaneous transverse tilt of the towed vehicle, such as the rocking motion which occurs when traversing uneven or rough pavement for example. This situation, sometimes referred to as "roll", can be accommodated by tow bar apparatus designed to accommodate relative rotations between the towing and towed vehicles about a longitudinal, horizontal axis, see the "x"-axis in FIG. 1.

During actual towing operations, all combinations of the pitch, yaw and roll are constantly occurring and continuously changing. Prior art is replete with tow bar designs that have been developed in an attempt to accommodate these phenomena, some of those designs being more successful than others. For example, a ball hitch/ball hitch-receiver combination securing a tow bar to a towing vehicle can theoretically accommodate all three of the pitch, yaw and roll phenomena. Although the ability of such a combination to accommodate yaw is acceptable and the pivot axis therefor is well-defined, unfortunately the ability of such a hitch combination to accommodate either pitch or roll is extremely limited. Failure to strictly observe and properly accommodate such pitch and roll limitations can result in disastrous and even fatal consequences.

Another commonly used hitch arrangement involves using a conventional receiver hitch in combination with a conventional square hitch tube. Although such an arrangement may be convenient for connecting a tow bar to a towing vehicle, this type of connection by itself provides absolutely no ability to accommodate any one of the three pitch, yaw or roll phenomena. As a result, either the tow bar and/or connections between the tow bar and the towed vehicle must be relied upon to provide a solution for minimizing the potentially detrimental effects arising from pitch, yaw and roll.

Another arrangement that is useful, particularly when towing massive vehicles, such as heavy military equipment for example, comprises a pintle hitch of a towing vehicle connected to a lunette ring hitch. Such a pintle/lunette ring hitch arrangement does provide the ability to accommodate pitch, yaw and roll attitudes between the towing and towed vehicles. Unfortunately, this type of hitch arrangement inherently produces some play, although sometimes minimal, between the pintle and the lunette ring. As a result, neither the pitch axis nor the yaw axis are well-defined since the pintle continually shifts back and forth, and forwardly and rearwardly in the opening through the lunette ring. In so doing, the magnitude of the applied towing force is constantly differing between the two tow bar legs causing the towed vehicle to wander or fishtail to a greater extent behind the towing vehicle than it would if the yaw axis between the pintle and lunette ring were well-defined. Such tendency to fishtail exacerbates wear and tear on the towing vehicle, on the towed vehicle, on the pintle, on the lunette ring, and on the pivotal connections between the tow bar legs and the tow bar head, which also visits greater stress on the operator of the towing vehicle while having to contend with such undesirable added activity between the towing and towed vehicles.

What is needed is a tow bar that counteracts the tendency of a towed vehicle to wander or fishtail, which tendency operatively arises from the inherent play between a pintle and lunette ring hitch connection between towing and towed vehicles.

Typically, a tow bar is first connected to a towing vehicle followed by connecting the tow bar to the towed vehicle. It is difficult, if not impossible, to perfectly align a towing vehicle with, and perfectly space the towing vehicle from, a towed vehicle so the tow bar legs can be easily and conveniently connected to the towed vehicle. Many towing, hitch arrangements of towed vehicles require precise fore-to-aft, horizontal, and angular alignment of connectors of the two tow bar legs with mating connections of the towing hitch arrangement of the towed vehicle so pivot pins can be properly inserted through orifices of those mating connections while the tow bar legs are physically held in place relative to the connections of the towed vehicle. Such activity can be extremely stressful, sometimes requiring the efforts of more than one person, such as when connecting massive tow bars used for towing heavy military equipment for example. Such stress and effort could be reduced considerably if each of the tow bar leg connectors could be individually articulated in close proximity to the towed vehicle so each tow bar leg connector could be easily and conveniently mated separately with the towing hitch arrangement of the towed vehicle while the pivot pins are being inserted.

What is needed is a tow bar wherein the tow bar legs are separately extendable and retractable as needed to accommodate the difference in span of each tow bar leg when connecting the tow bar legs to a towed vehicle hitching arrangement.

What is also needed is a tow bar having articulated tow bar leg connectors for connecting tow bar legs to a towed vehicle hitch arrangement.

In an actual towing operation, it is essential that the spans of the tow bar legs from the tow bar head to the towed hitch arrangement are equal. For tow bar legs which are freely extendable and retractable to simplify connection to the towed vehicle as aforesaid, the spans after making the connections are generally unequal.

What is needed is a tow bar having a locking mechanism which, after connecting to a towed vehicle, separately and automatically locks the tow bar legs wherein the spans of the two bar legs are equal for towing purposes.

Some prior art tow bars are designed to provide a storage capability for the tow bar when the tow bar is not being used. Some of those designs are for tow bars that remain connected to the towed vehicle, such as by pivoting the tow bar legs upwardly at the front end of the towed vehicle and securing the tow bar legs in an upright configuration for example. Needless to say, such a method of storage can be very unsightly and may obstruct forward vision when the towed vehicle is subsequently being driven under its own power. Also, this arrangement is not efficient for situations wherein the towing vehicle needs to use that tow bar to tow other vehicles.

Accordingly, some prior art tow bars are designed to provide a storage capability wherein the tow bar remains connected to, and stored on, the towing vehicle such as by pivoting the tow bar legs upwardly or sidewise at the rear end of the towing vehicle and securing the tow bar legs in that configuration such as by hooking the tow bar legs another part of the tow bar. Unfortunately, it is not uncommon for such arrangements to become unhooked, especially when the towing vehicle travels over very rough terrain, such as railroad tracks, potholes, and the like.

What is needed is a tow bar wherein the tow bar legs have self-storing capability and a mechanism which automatically latches the tow bar legs in a self-storing configuration.

What is also needed is a latching mechanism which is capable of automatically latching the tow bar legs in either the self storing configuration or a deployed configuration wherein the spans of the tow bar legs are equal.

What is further needed is a release mechanism which enables a user to manually and without tools unlock the latching mechanism.

SUMMARY OF THE INVENTION

The improvements for a tow bar for connecting a towing vehicle to a vehicle to be towed include a towing hitch member with a pintle hitch secured to the towing vehicle; a towed vehicle hitch member secured to the vehicle to be towed; a head member; a lunette ring connected to the head member and structured to releasably connect the head member to the pintle hitch; a pair of tow bar legs, each having a proximal end including a hollow outer member with a distal end and a first axis, a distal end including an inner member with a second axis colinearly-aligned with the first axis and a proximal end longitudinally and telescopingly displaceable within the outer member, wherein the proximal end of one of the first and second tow bar legs is pivotally connected to the head member and the other one of the first and second tow bar legs is fixedly connected to the head member; aft leg connector mechanisms secured to the distal ends of the tow bar legs wherein the aft leg connector mechanisms are structured to releasably connect the tow bar legs to the towed vehicle hitch member; and a latching mechanism including latching portions, locking portions, and release mechanisms.

Each of the latching portions is structured to automatically and releasably retain a respective one of the tow bar legs in a stored configuration, and includes a plunger with a shaft having a tapered end with a peripheral ridge thereabout with the plunger centered about the first axis and extending forwardly from the proximal end of the respective inner member, and a retainer secured to the respective outer member near the proximal end thereof wherein the retainer includes a resilient O-ring structured to latchingly and releasably receive the shaft between the ridge and the proximal end of the inner member in a stored configuration Similarly, each of the locking portions is secured to the of an outer member of a respective one of the tow bar legs near the distal end thereof wherein each locking portion is structured to lock the tow bar legs in a deployed configuration and includes a housing having a slot, an orifice through a wall of the hollow outer member, a latch device having a distal end and slidingly mounted in the slot wherein the latch device is radially displaceable relative to the respective outer member, and a biasing mechanism with a spring captured in a cavity of the latch device wherein the biasing mechanism is structured to bias the latch device radially inwardly through the orifice wherein the latch device extends into the path of the inner member; and Each of the release mechanisms is structured to enable manual displacement of each of a respective latch devices radially outwardly relative to the outer member and clear of the path of the inner member wherein each release mechanism includes at least one eccentric cam pivotally mounted to the latch device wherein the at least one cam pivots about a pivot axis relative to the latch device; and a handle mounted to the at least one eccentric cam wherein the handle is structured to enable manual displacement of the latch device radially outwardly relative to the respective outer member and clear of the path of the respective inner member.

PRINCIPAL OBJECTS AND ADVANTAGES OF THE INVENTION

The principal objects and advantages of the present invention include: providing a tow bar structured to counteract the tendency of a towed vehicle to wander or fishtail which tendency operatively arises from the inherent play between a pintle and lunette ring hitch connection between towing and towed vehicles; providing such a tow bar wherein the tow bar legs are separately extendable and retractable as needed to accommodate the difference in span of each tow bar leg when connecting the tow bar legs to a towed vehicle hitching arrangement; providing such a tow bar having articulated tow bar leg connectors for connecting tow bar legs to a towed vehicle hitch arrangement; providing such a tow bar having a latching mechanism which, after connecting to a towed vehicle, separately and automatically locks the tow bar legs in a deployed configuration wherein the spans of the two bar legs are equal for towing purposes; providing such a tow bar having a cammed release mechanism for manually and toollessly unlocking the tow bar from the deployed configuration; providing such a tow bar wherein the tow bar legs have self-storing capability; providing such a tow bar having a latching mechanism which automatically and releasably latches the tow bar legs in a self-storing configuration; providing such a tow bar having a locking mechanism which is capable of latching the tow bar legs in either a self storing configuration or locking the tow bar legs in a deployed configuration wherein the spans of the tow bar legs are equal; and generally providing such a tow bar that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example and without limitation, certain embodiments of this invention.

DETAILED DESCRIPTION OF THE INVENTION

As required, embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

A tow bar typically connects the rear end of a towing vehicle 3 to the front end of a towed vehicle 5. The reference numeral 10 refers to a tow bar in accordance with the present invention, as shown in FIGS. 1 through 17. The tow bar 10 includes a towing hitch member 12, a head member 14, at least one tow bar leg 16, fore leg connector mechanism 18, latching mechanism 20, aft leg connector mechanisms 22, and a towed vehicle hitch member 24.

The following description of the present invention is directed to applications of the present invention for a tow bar 10 having a pair of tow bar legs 16, designated herein by numerals 26, 28, each tow bar leg 26, 28 having a proximal end 30 and a rearwardly-extending distal end 32.

Applications of the present invention 10 for tow bars having only one tow bar leg 16 will be obvious to persons skilled in the tow bar art based on the present disclosure.

Figure 1:
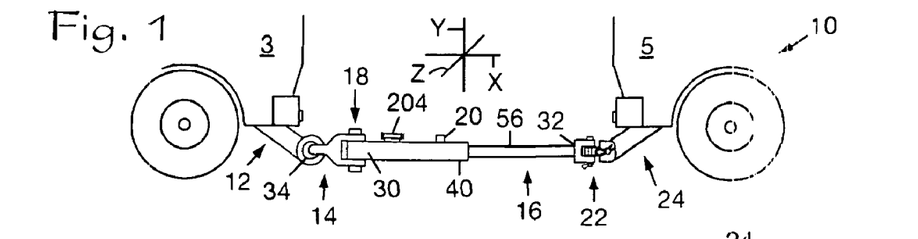
FIG. 1 is a side elevational view of a tow bar in use, in accordance with the present invention.
Figures 2, 3, 5:
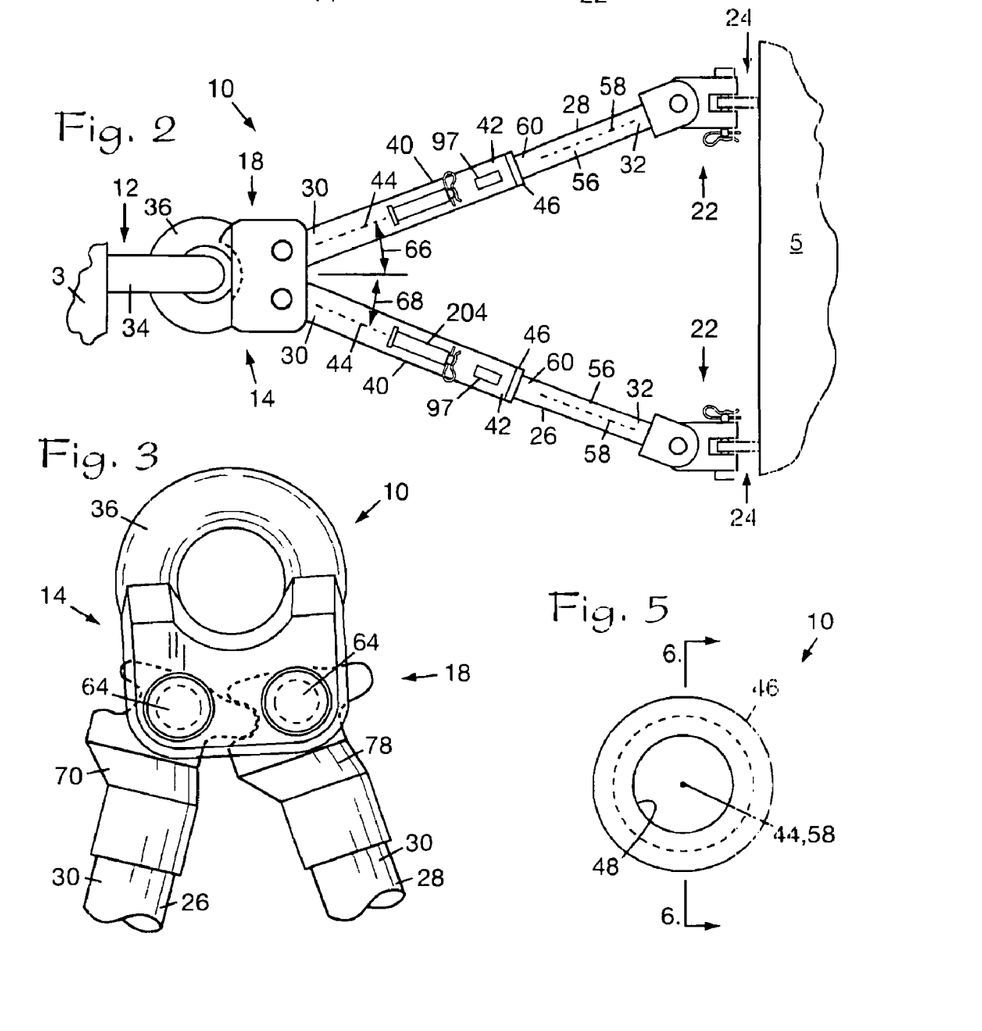
FIG. 2 is an enlarged top plan view of the tow bar.
FIG. 3 is a further enlarged and fragmentary top plan view, partially shown in dashed lines, of a head member and a leg connector mechanism of the tow bar.
FIG. 5 is an enlarged elevational view of an adapter device of the tow bar.

The towing hitch member 12 of the present invention 10 is secured to the rear end of the towing vehicle 3 and generally includes a pintle hitch 34, as shown in FIGS. 1-2. The towed vehicle hitch member 24 is secured to the towed vehicle 5.

Figures 4, 6, 7:
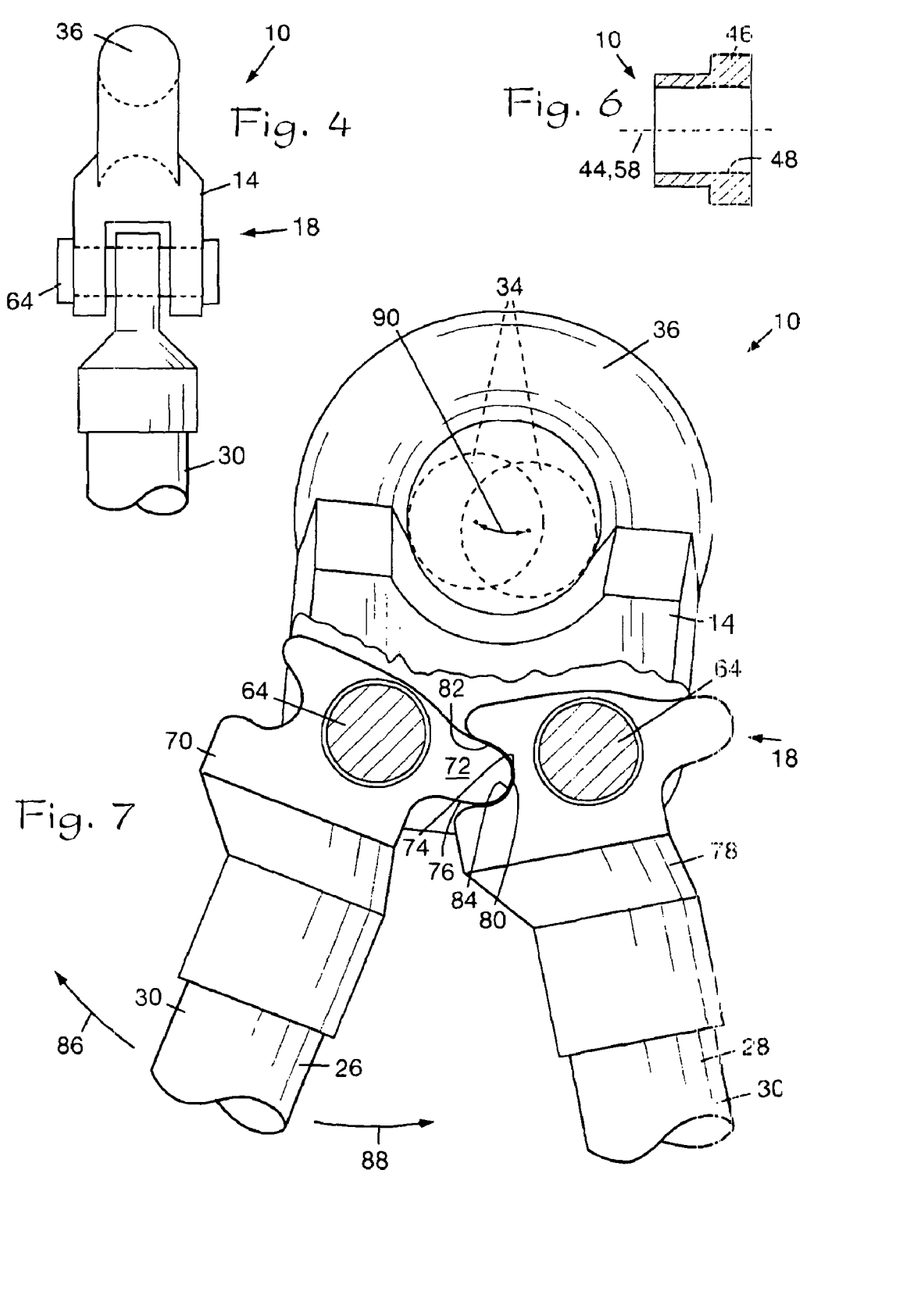
FIG. 4 is similar to FIG. 3 but shows a side elevational view of the head member and the leg connector mechanism of the tow bar.
FIG. 6 is a cross-sectional view of the adapter mechanism of the tow bar taken along line 6-6 of FIG. 5.
FIG. 7 is a still further enlarged and fragmentary, partially cross-sectional top plan view of the tow bar with portions cut away to reveal details thereof.

The head member 14 generally includes a forwardly extending lunette ring 36, as shown in FIGS. 3 and 4, wherein the lunette ring 36 is structured to releasably connect the head member 14 to the pintle hitch 34 of the towing hitch member 12. It is to be understood that for some applications of the present invention 10, the towing hitch member 12 may include a conventional receiver hitch, a hitch ball, a pintle, or other suitable arrangement, and the head member 14 may include a square tube for a conventional receiver hitch, a hitch ball receiver, a lunette ring, or other suitable arrangement.

Each of the tow bar legs 26, 28 includes a hollow outer member 40 having proximal end 30, a distal end 42, a first axis 44, an adapter device 46 having an adapter orifice 48 therethrough and secured to the distal end 42 of the outer member 40 with the adapter orifice 48 axially aligned with the first axis 44, as shown in FIGS. 2, 5 and 6.

Figures 8, 9, 10, 11, 12, 13:
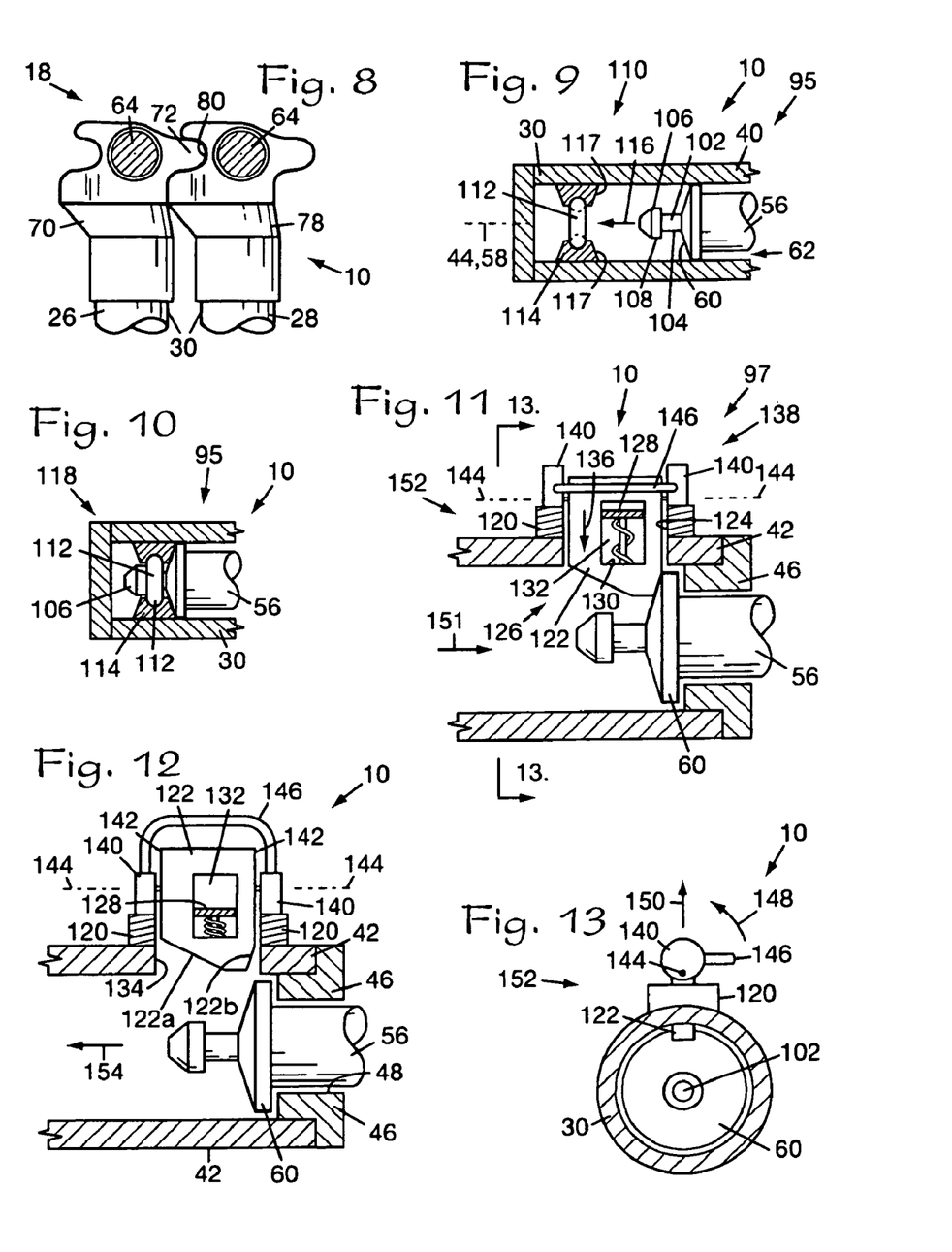
FIG. 8 is another top plan view showing the first and second cam portions of the leg connector mechanism of the tow bar.
FIG. 9 is an enlarged partially cross-sectional view of a latching portion of a latching mechanism of the tow bar.
FIG. 10 is partially cross-sectional view of the latching portion shown in FIG. 9, but showing a tow bar leg of the tow bar being retained in a stored configuration.
FIG. 11 a further enlarged and partially cross-sectional view of a locking portion of the latching mechanism showing a tow bar leg of the tow bar in a locked and deployed configuration.
FIG. 12 is a partially cross-sectional view of the aft latching portion shown in FIG. 11 but showing the tow bar leg unlocked from the deployed configuration.
FIG. 13 is a partially cross-sectional end view of the tow bar taken along line 13-13 of FIG. 11.
Figures 14, 15:
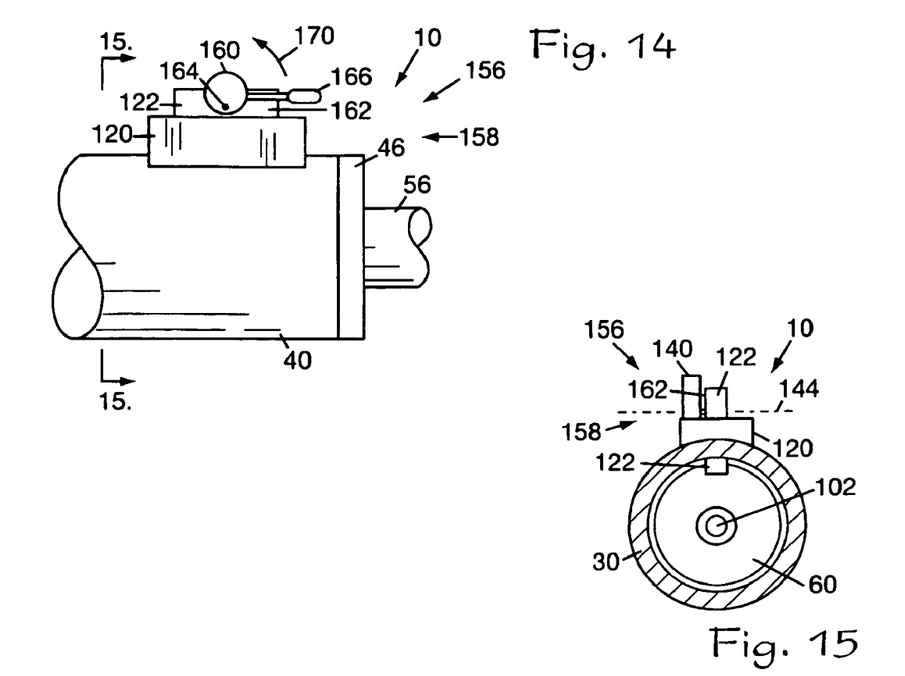
FIG. 14 is a side elevational view of an alternate embodiment of the latching portion of the latching mechanism of the tow bar, according to the present invention.
FIG. 15 is a partially cross-sectional view of the alternate embodiment of the latching portion of the tow bar taken along line 15-15 of FIG. 14, according to the present invention.

Each of the tow bar legs 26, 28 also includes an inner member 56 having distal end 32, second axis 58, and proximal end 60 dimensioned to be slidably and telescopingly displaceable in outer member 40 with the second axis 58 colinearly aligned with first axis 44, wherein a narrow annular cavity 62 is formed between outer member 40 and inner member 56, as shown in FIG. 9.

The fore leg connector mechanism 18 generally includes a pair of pivot pins pivotally connecting proximal ends 30 of the tow bar legs 26, 28 to the head member 14. Preferably, the fore leg connector mechanism 18 is structured to maintain the tow bar legs 26, 28 at equal but opposite angles 66, 68 relative to the head member 14, as indicated in FIG. 2. For example, the leg connector mechanism 18 generally includes a first cam portion 70 secured to proximal end 30 of the first tow bar leg 26, wherein the first cam portion 70 includes a protrusion 72 having a fore outer surface 74 and an aft outer surface 76.

The fore leg connector mechanism 18 generally also includes a second cam portion 78 secured to proximal end 30 of the second tow bar leg 28, wherein the second cam portion 78 includes a recess 80 having a fore inner surface 82 and an aft inner surface 84 which cooperatively engage the protrusion 72 of the first cam portion 70.

In other words, the protrusion 72 and the recess 80 are structured wherein, as the first tow bar leg 26 is angularly displaced away from the second tow bar leg 28, as indicated by the arrow designated by numeral 86 in FIG. 7, the aft outer surface 76 of the protrusion 72 of the first cam portion 70 bears against and slides along the aft inner surface 84 of the second cam portion 78. In response thereto, the fore inner surface 82 of the recess 80 of the second cam portion 78 slides along the fore outer surface 74 of the first cam portion 70 to thereby maintain the first and second tow bar legs 26, 28 at equal and opposite angular orientations relative to the head member 14 as the tow bar legs 26, 28 are angularly displaced away from each other.

Similarly, as the first tow bar leg 26 is angularly displaced toward the second tow bar leg 28, as indicated by the arrow designated by numeral 88 in FIG. 7, the fore outer surface 74 of the protrusion 72 of the first cam portion 70 bears against and slides along the fore inner surface 82 of the recess 80 of the second cam portion 78. In response thereto, the aft inner surface 84 of the recess 80 of the second cam portion 78 slides along the aft outer surface 76 of the protrusion 72 of the first cam portion 70 to thereby maintain the first and second tow bar legs 26, 28 at equal and opposite angular orientations relative to the head member 14 as the tow bar legs 26, 28 are angularly displaced toward each other.

Simply stated, the first and second cam portions 70, 78 of the leg connector mechanism 18 and the spacing between axes of the pivot pins 64 which pivotally connect the first and second cam portions 70, 78 to the head member 14, are profiled and dimensioned wherein the protrusion 72 is captured within the recess 80 thereby ensuring that the first and second tow bar legs 26, 28 are maintained at equal and opposite angular orientations relative to the head member 14, thereby further ensuring that a towing load is distributed substantially equally to both tow bar legs 26, 28 and that turning paths of a towed vehicle relative to a towing vehicle are substantially identical, whether turning to the left or to the right.

Preferably, the first and second cam portions 70, 78 of the fore leg connector mechanism 18 are substantially identical to each other in order to reduce manufacturing costs, see FIG. 8.

Based on the teachings herein, it will be obvious to persons skilled in the relevant art that the fore leg connector mechanism 18, by maintaining the tow bar legs 26, 28 at equal and opposite angular orientations relative to the head member 14, eliminates unequal distributions of the towing load to the tow bar legs 26, 28, which would otherwise arise from the lunette ring 36 shifting back and forth relative to the pintle hitch 34 during towing operations, as indicated by the dashed lines and arrow designated by numeral 90 in FIG. 7.

It is foreseen that some applications within the scope and nature of the present invention may utilize other leg connector mechanisms that maintain the tow bar legs 26, 28 at equal and opposite angular orientations, such as a pair of mating cog-type gears in lieu of the first and second cam portions 70, 78. An advantage of the embodiment utilizing the first and second cam portions 70, 78 described herein includes the abutting surfaces of the protrusion 72 and recess 80 presenting large bearing surfaces 74, 76, 82, 84 which are continuous and oriented substantially transversely relative to the forces applied thereagainst, thereby reducing wear and tear thereof, than might be realized with a cog-type gear arrangement for example.

The latching mechanisms 20 of each of the tow bar legs 26, 28 includes a fore latching portion 95 and an aft locking portion 97. The fore latching portion 95 includes a cylindrically-shaped plunger 102 extending forwardly from proximal end 60 of the inner member 56 and centered about the first and second axes 44, 58. The plunger 102 includes a shaft 104, a tapered end 106, and a peripheral ridge 108 about the tapered end 106 of the plunger 102, as shown in FIG. 9.

Each fore latching portion 95 also includes a retainer 110 secured to the outer member 40 of the respective tow bar leg 26, 28 near proximal end 30 thereof. For example, the retainer 110 may include a resilient O-ring 112, as shown in FIG. 9. The O-ring 112 extends into the path of the ridge 108 and the retainer 110 extends into the path of the inner member 56 whereat the retainer 110 is abuttingly engageable with proximal end 60 of inner member 56 as it is displaced longitudinally inwardly into the outer member 40 along the first and second axes 44, 58, as indicated by the arrow designated by numeral 116.

The basic function of each fore latching portion 95 can be described as follows. As the inner member 56 of a tow bar leg 26, 28 is being longitudinally displaced inwardly relative to its respective outer member 40 wherein as the plunger 102 is forced against the O-ring 112, the O-ring 112 responsively expands allowing the plunger 102 to pass through the O-ring 112 whereupon the O-ring 112 immediately and resiliently shrinks to grasp the shaft 104 of the plunger 102, thereby trapping the O-ring 112 between ridge 108 and proximal end 60 of the inner member 56, thereby retaining inner member 56 in a stored configuration 118, as shown in FIG. 10. Subsequently, a user can release the respective tow bar leg 26, 28 from the stored configuration 118 by pulling longitudinally outwardly on distal end 32 of the inner member 56, thereby causing ridge 108 to pass back through O-ring 112.

Each aft locking portion 97 includes a housing 120 secured to outer member 40 of the respective tow bar leg 26, 28 near the distal end 42 thereof and a latch 122 slidingly mounted in a slot 124 formed in housing 120, as indicated in FIGS. 11 and 12. Each aft locking portion 97 includes a biasing mechanism 126, such as a coil spring or other resilient device, trapped between a cross member 128 of the housing 120 and a wall 130 of a cavity 132 formed in latch 122, as shown in FIGS. 11 and 12. The biasing mechanism 126 is structured to operatively bias latch 122 radially inwardly relative to the outer member 40 and through an orifice 134 formed through the wall of the hollow outer member 40, as indicated by the arrow designated by numeral 136 in FIG. 11, wherein latch 122 normally extends into the path of proximal end 60 of the respective inner member 56.

The aft locking portion 97 includes a release mechanism 138, such as an opposing pair of arcuately-shaped eccentric cams 140, pivotally connected to ends 142 of latch 122 for rotation about pivot axis 144. A handle 146, secured to eccentric cams 140 for example, is structured to enable a user to manually rotate the eccentric cams 140, as indicated by numeral 148, to thereby displace latch 122 radially outwardly relative to outer member 40 and clear of the path of the respective inner member 56, as indicated by the arrow designated by numeral 150 in FIG. 13. The arrangement of handle 146 in cooperation with eccentric cams 140 is designed to provide a mechanical advantage wherein the latch 122 is manually displaceable radially outwardly without the need for other prying tools even though proximal end 60 of inner member 56 may be binding and resisting outward displacement of latch 122.

The basic function of each aft locking portion 97 can be described as follows. As inner member 56 of a tow bar leg 26, 28 is being longitudinally displaced outwardly relative to the respective outer member 40, as indicated by the arrow designated by numeral 151, proximal end 60 of the inner member 56 engages tapered edge 122a of the latch 122 thereby forcing latch 122 radially outwardly and compressing spring 126. After latch 122 slides over proximal end 60 of inner member 56 and inner member 56 becomes spaced between latch 122 and the adapter device 46, the biasing mechanism 126 automatically biases latch 122 into the path of the inner member 56 wherein edge 122b of the latch 122 is abuttingly engageable with proximal end 60 of the inner member, thereby locking the inner member 56 in a deployed configuration 152, as shown in FIGS. 11 and 13. Subsequently, a user can release the respective tow bar legs 26, 28 from the deployed configuration 152 by manually lifting handle 146 causing eccentric cams 140 to rotate about pivot axis 144 while bearing against housing 120 to thereby withdraw the latch 122 from obstructing the path of inner member 56 and then manually displacing the inner member 56 inwardly relative to the respective outer member 40, as indicated by the arrow designated by numeral 154 in FIG. 12.

An alternate embodiment 156 of each aft locking portion is similar to aft locking portion 97 and includes biasing mechanism 126 which biases the latch 122 radially inwardly relative to the outer member 40, as hereinbefore described. The alternate embodiment 156 includes a release mechanism 158, such as an arcuately-shaped eccentric cam 160 pivotally connected to a side 162 of the latch 122 for rotation about pivot axis 164. A handle 166 secured to the eccentric cam 160, for example, is structured to enable a user to manually rotate the eccentric cam 160 about pivot axis 164, as indicated by numeral 168, wherein cam 160 bears against housing 120 to thereby displace the latch 122 radially outwardly relative to outer member 40 and clear of the path of the leg inner member 56, as indicated by the arrow designated by numeral 170 in FIG. 14. Again, the arrangement of handle 166 in cooperation with the eccentric cam 160 is designed to provide a mechanical advantage wherein latch 122 can be manually displaced radially outwardly without the need for other prying tools even though proximal end 60 of inner member 56 may be binding and resisting outward displacement of the latch 122.

The aft leg connector mechanisms 22 are secured to the respective distal ends 32 of the first and second tow bar legs 26, 28. The aft leg connector mechanisms 22 are structured to releasably connect distal ends 32 of tow bar legs 26, 28 to the towed vehicle hitch member 24.

Figure 16:
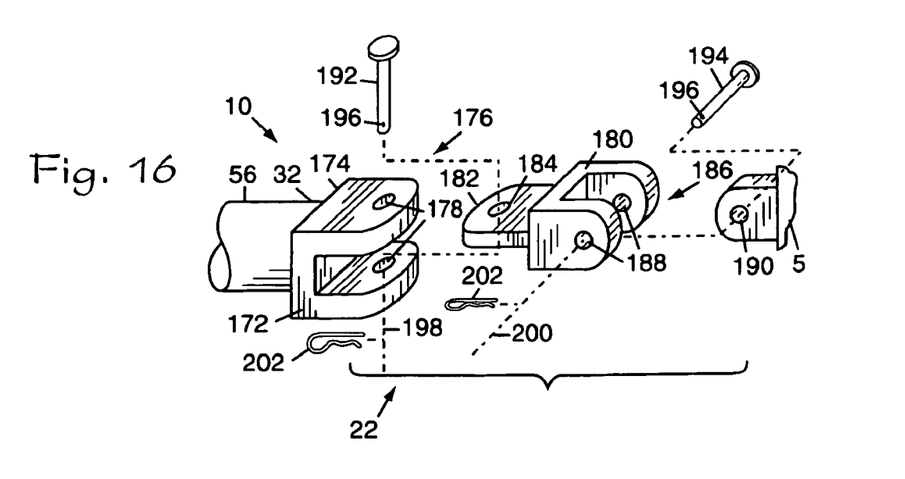
FIG. 16 is an enlarged and exploded, perspective view of an aft leg connector element of the tow bar, according to the present invention.

Each of the aft leg connector mechanisms 22 includes a first clevis unit 172 having a first clevis end 174 secured to distal end 32 of inner member 56 of the respective tow bar leg 26, 28. The first clevis unit 172 also includes a pair of rearwardly-extending first clevis legs 176 having aligned first clevis orifices 178 therethrough, as shown in FIG. 16.

Each aft leg connector mechanism 22 also includes a second clevis unit 180 having a second clevis end 182 with a second clevis orifice 184 therethrough. The second clevis end 182 is dimensioned to be removably insertable between the pair of first clevis legs 176, wherein the second clevis orifice 184 is alignable with the first clevis orifices 178 of the pair of first clevis legs 176. The second clevis unit 180 also includes a pair of rearwardly-extending second clevis legs 186 having aligned third clevis orifices 188 therethrough, wherein the third clevis orifices 188 are alignable with an orifice 190 of the towed vehicle hitch member 24.

Each aft leg connector mechanism 22 also includes first and second pivot pins 192, 194 having bores 196 therethrough. The first pivot pin 192 is dimensioned to be removably insertable through both the second clevis orifice 184 of the second clevis unit 180 and the first clevis orifices 178 of the first clevis unit 172, wherein the second clevis unit 180 is pivotable about the first pivot pin 192 relative to the first clevis unit 172, sometimes referred to herein as a first pin axis 198.

Similarly, the second pivot pin 194 is dimensioned to be removably insertable through both the orifice 190 of the towed vehicle hitch member 24 and the third clevis orifices 188 of the second clevis unit 180, wherein the second clevis unit 180 is pivotable about the second pivot pin 194 relative to the towed vehicle hitch member 24, sometimes referred to herein as a second pin axis 200.

Cotter-type pins 202 removably insertable through bores 196 of the first and second pivot pins 192, 194 releasably secure the first and second pivot pins 192, 194 in the towed vehicle hitch member 24 and the first and second clevis units 172, 180. Preferably, the sizing and dimensions of the second pivot pin 194 are identical to those of the first pivot pin 192.

Figure 17:
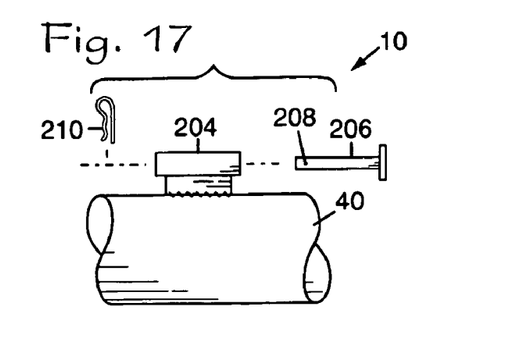
FIG. 17 is an enlarged side view of a pin retainer and pin of the tow bar.

The tow bar 10 of the present invention may include a pin retainer 204 secured to the tow bar 10, such as to one or each of the outer members 42 of the tow bar legs 26, 28 for example, as shown in FIG. 17. Each pin retainer 204 includes a third pivot pin 206 having a bore 208 therethrough, wherein the third pivot pin 206 is sized and dimensioned to replace the first or second pivot pins 192, 194. The pin retainer 204 also includes a cotter-type pin 210 through bore 208 of the third pivot pin 206 to releasably secure the third pivot pin 206 in the pin retainer 204.

It is difficult, if not impossible, to perfectly align a towing vehicle with, and perfectly space the towing vehicle from, a towed vehicle in preparation for connecting the towed vehicle to the towing vehicle. The aft leg connector mechanisms 22 and the aft locking portions 97 of the tow bar legs 26, 28 are structured to easily, conveniently and cooperatively accommodate imperfect spacing and alignment between the towed and towing vehicles 3, 5. The improvement provided from this arrangement arises from the ability of the second clevis unit 180 to be pivoted about the first pin axis 198 relative to the first clevis unit 172 simultaneously with the ability of the inner member 56 to be rotated about the first axis 44 relative to its respective outer member 40 thereby enabling orthogonal articulation of each aft leg connector mechanism 22 relative to the towed vehicle hitch member 24.

After connecting the aft leg connector mechanisms 22 to the towed vehicle 5, the added combination of the further orthogonal articulation provided by the ability of the second clevis unit 180 to be simultaneously pivotable about the second pin axis 200 relative to the towed vehicle hitch member 24 enables the aft leg connector mechanisms 22 to assist other components of the tow bar 10 in accommodating all three pitch, yaw and roll components between the towing and towed vehicles, which is a substantial improvement over the no-axis or single-axis articulation provided by prior art tow bar connections between the tow bar legs and a towed vehicle.

Figure 18:
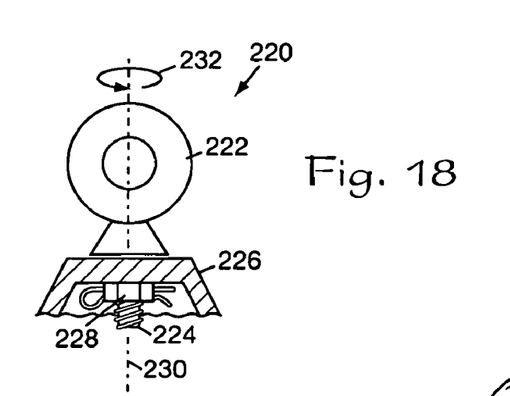
FIG. 18 is a partially cross-sectional top plan view of a first modified embodiment of the tow bar, according to the present invention.

A first modified embodiment 220 of the tow bar is shown in FIG. 18. Many of the features of the first modified embodiment 220 are similar to those of embodiment 10 hereinbefore described and, therefore, will not be reiterated here in detail. The first modified embodiment 220 of the tow bar includes a lunette ring 222 having a rearwardly-extending appendage 224 pivotally connected to a head member 226 of the tow bar 220 by a fastener 228, such as a nut secured by a cotter pin for example, which allows the lunette ring 222 to swivel about a longitudinal axis 230 relative to the head 226, as indicated by the arrow designated by numeral 232.

A benefit provided by tow bar 220 is the enablement of being able to accommodate a substantially different transverse tilt of a towing vehicle relative to a transverse tilt of a towed vehicle wherein that difference in transverse tilt is substantially greater than the relative transverse tilt allowable by prior art pintle/lunette ring connections where the lunette ring is not pivotable relative to the head of the tow bar. The enablement provided by the swivelling head of tow bar 220 is extremely important in applications where heavy equipment is being towed over very rough terrain, such as when military equipment is being towed in field operations.

Figure 19:
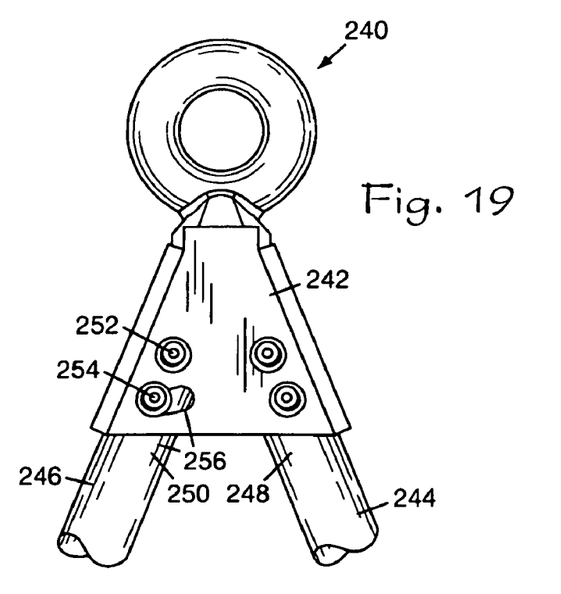
FIG. 19 is a fragmentary top plan view of a second modified embodiment of the tow bar, according to the present invention.

A second modified embodiment 240 of the tow bar is shown in FIG. 19. Many of the features of the second modified embodiment 240 are similar to those of embodiment 10, or of first modified embodiment 220, hereinbefore described and, therefore, will not be reiterated here in detail. The second modified embodiment 240 of the tow bar includes a head member 242 and a pair of tow bar legs 244, 246 having proximal ends 248, 250, respectively. Proximal end 248 of tow bar leg 244 is fixedly secured to head member 242. Proximal end 250 of tow bar leg 246 is pivotally connected to head member 242 by pin 252. Pin 254 is secured to tow bar leg 246 through arcuate slot 256 wherein tow bar leg 246 can be angularly displaced about pin 252 to thereby position tow bar leg 246 either at an equal and opposite angular orientation relative to tow bar leg 244 as shown in FIG. 19 for deployment purposes, or alongside tow bar leg 244 for storage purposes.

In an application of the present invention, the rear end of the towing vehicle 3 is temporarily positioned forwardly from the front end of the towed vehicle 5. The fore-and-aft orientations of the towing and towed vehicles need not be perfectly aligned, nor does the spacing between the vehicles need to be exact. The lunette ring 36 is then securely connected to the pintle hitch 34 of the towing vehicle 3.

If the tow bar legs 26, 28 are in the stored configuration 118, distal ends 32 of the tow bar legs 26, 28 are pulled longitudinally outwardly to disengage the plungers 102 from the retainers 110 to thereby place the proximal ends 60 of the inner members 56 of the tow bar legs 26, 28 unretained and unlocked between the fore latching portion 95 and the aft locking portion 97 so inner members 54 of the tow bar legs 26, 26 can be easily displaced longitudinally relative to their respective outer members 42. Each of the tow bar legs 26, 28 is then separately extended or retracted as necessary to adjust its length to accommodate the temporary spacing between the towing and towed vehicles while the inner member 56 thereof is rotated relative to its outer member 40 and the second clevis unit 180 of its aft leg connector mechanism 22 is pivoted about the first pivot pin 192 relative to the first clevis unit 172 in order to easily and conveniently align the third clevis orifices 188 with the orifice 190 through the towed vehicle hitch member 24. The second pivot pin 194 is then inserted through orifices 188 and secured in place with the cotter-type pin 202.

After both tow bar legs 26, 28 have been so connected to the towed vehicle hitch member 24, the towing vehicle 3 is slowly eased forwardly relative to the towed vehicle 5 thereby causing proximal end 30 of each tow bar leg 26, 28 to be spaced between latch 122 of its aft locking portion 97 and the adapter device 46 of its respective tow bar leg 26, 28 whereupon the respective latch 122 immediately and automatically is biased into the path of the respective inner member 56 thereby locking the tow bar legs 26, 28 in the deployed configuration 152. The towed vehicle 5 is then properly aligned with, and spaced at a desired predetermined towing distance from, the towing vehicle 3. After attaching safety chains and making necessary electrical and braking connections, the towed vehicle 5 is ready to be towed.

Later, when the tow bar 10 has been disconnected from the towed vehicle 5 and is no longer being used, and with the tow bar legs 26, 28 unlocked from the deployed configuration 152, the inner member 56 of each tow bar leg 26, 28 can be separately, longitudinally and telescopingly displaced in its respective outer member 40 toward the head member 14, wherein the tapered end 106 is forced against and through the O-ring 112 of the respective retainer 110 of its fore latching portion 95 thereby placing the tow bar legs 26, 28 in the stored configuration 118.

It is to be understood that while certain forms of the present invention have been illustrated and described herein, it is not to be limited to the specific forms or arrangement of parts as described and shown.

What is claimed and desired to be covered by Letters Patent is as follows:

1. A tow bar for connecting a towed vehicle to a towing vehicle, the tow bar comprising:
    (a) a towing hitch member secured to a towing vehicle;
    (b) a towed hitch member secured to a towed vehicle;
    (c) a head member structured to be releasably connectable to the towing hitch member;
    (d) at least one tow bar leg having:
        (1) a proximal end including an outer member with a distal end, and
        (2) a distal end including an inner member with a proximal end telescopingly displaceable within the distal end of the outer member;
    (e) a fore leg connector mechanism connecting the proximal end of the at least one tow bar leg to the head member;
    (f) an aft leg connector mechanism structured to be releasably connectable to the towed hitch member; and
    (g) at least one latching mechanism including a locking portion secured to the at least one tow bar leg near the distal end of the outer member thereof, the locking portion structured to automatically and releasably lock the at least one tow bar leg in a deployed configuration, the locking portion including:
        (1) a housing having a slot,
        (2) an orifice through a wall of the outer member,
        (3) a latch device having a distal end, the latch device being slidingly mounted in the slot, and
        (4) a biasing mechanism structured to bias the latch device radially inwardly and through the orifice of the outer member wherein the distal end of the latch device extends into a path of the inner member.

2. A tow bar as described in claim 1, further comprising: a cammed release mechanism structured to enable manual displacement of the latch device radially outwardly relative to the outer member and clear of the path of the inner member to thereby release the locking portion from the deployed configuration.

3. A tow bar for connecting a towing vehicle to a towed vehicle, the tow bar comprising:
 (a) a towing hitch member secured to a towing vehicle;
 (b) a towed hitch member secured to a towed vehicle;
 (c) a head member structured to be releasably connectable to the towing hitch member;
 (d) at least one tow bar leg having:
  (1) a proximal end including an outer member with a distal end,
  (2) a distal end including an inner member with a proximal end telescopingly displaceable within the distal end of the outer member, and
  (3) wherein the proximal end of the at least one tow bar leg is pivotally connected to the head member;
 (e) an aft leg connector mechanism secured to the distal end of the at least one tow bar leg, the aft leg connector mechanism being structured to releasably connect the at least one tow bar leg to the towed hitch member; and
 (f) latching mechanisms, each including:
  (1) a locking portion secured to the outer member near the distal end thereof and including:
   (A) a housing having a slot,
   (B) an orifice through a wall of the outer member,
   (C) a latch device having a distal end and being slidingly mounted in the slot, and
   (D) a biasing mechanism with a spring captured in a cavity of the latch device, the biasing mechanism structured to bias the latch device radially inwardly through the orifice wherein the latch device extends into a path of the inner member,
   (E) wherein the locking portion is structured to lock the inner member of the at least one tow bar leg relative to the outer member of the at least one tow bar leg in a deployed configuration;
  (2) a latching portion structured to automatically and releasably retain the at least one tow bar leg in a stored configuration, the latching portion including:
   (A) a plunger with a shaft having a tapered end with a peripheral ridge thereabout, the plunger extending forwardly from the proximal end of the inner member, and
   (B) a retainer secured to the outer member near the proximal end thereof, the retainer including a resilient retaining mechanism structured to latchingly and releasably receive the plunger therethrough with the retaining mechanism spaced between the peripheral ridge of the plunger and the proximal end of the inner member.

4. A tow bar as described in claim 3, further comprising a release mechanism including:
 (a) at least one eccentric cam pivotally mounted to the latch device wherein the at least one eccentric cam is pivotable about a pivot axis relative to the latch device; and
 (b) a handle mounted to the at least one eccentric cam, the handle being structured to enable manual displacement of the latch device radially outwardly relative to the outer member and clear of the path of the inner member.

5. A tow bar for connecting a towing vehicle to a towed vehicle, the tow bar comprising:
 (a) a towing hitch member secured to a towing vehicle;
 (b) a towed hitch member secured to a towed vehicle;
 (c) a head member structured to be releasably connectable to the towing hitch member;
 (d) at least one tow bar leg having:
  (1) a proximal end including an outer member with a distal end, and
  (2) a distal end including an inner member with a proximal end telescopingly displaceable within the outer member;
 (e) a fore leg connector mechanism connecting the proximal end of the at least one tow bar leg to the head member;
 (f) an aft leg connector mechanism secured to the distal end of the at least one tow bar leg, the aft leg connector mechanism being structured to releasably connect the at least one tow bar leg to the towed hitch member; and
 (g) a latching mechanism including:
  (1) a locking portion secured to the outer member of the at least one tow bar leg near the distal end thereof, the locking portion structured to automatically and releasably lock the at least one tow bar leg in a deployed configuration wherein the locking portion includes a cammed release mechanism; and
  (2) a latching portion including:
   (A) a plunger extending forwardly from the proximal end of the inner member of the at least one tow bar leg, the plunger having a shaft with a tapered end and a peripheral ridge thereabout, and
   (B) a retainer secured to the outer member of the at least one tow bar leg near the proximal end thereof, the retainer including a resilient retaining mechanism structured to latchingly and releasably receive the plunger therethrough with the retaining mechanism spaced between the peripheral ridge of the plunger and the proximal end of the inner member in a stored configuration.

6. A latching mechanism for a tow bar with a head and at least one tow bar leg having a hollow outer member connected to the head and an inner member with a proximal end telescopingly displaceable within the outer member, the latching mechanism comprising:
 (a) a locking portion secured to an at least one tow bar leg near a distal end thereof, the locking portion structured to automatically and releasably lock an inner member of the at least one tow bar leg relative to an outer member of the at least one tow bar leg in a deployed configuration, the locking portion including:
  (1) a housing having a slot,
  (2) an orifice through a wall of the outer member,
  (3) a latch device having a distal end, the latch device being slidingly mounted in the slot, and
  (4) a biasing mechanism structured to bias the latch device radially inwardly and through the orifice of the outer member wherein the distal end of the latch device extends into a path of the inner member as the inner member is being displaced in the outer member.

7. A latching mechanism as described in claim 6, further comprising a cammed release mechanism structured to enable manual displacement of the latch device radially outwardly relative to the outer member and clear of the path of the inner member.

8. A latching mechanism as defined in claim 7, wherein each cammed release mechanism includes:
 (a) at least one eccentric cam pivotally mounted to the latch device wherein the at least one eccentric cam is pivotable about a pivot axis relative to the latch device; and
 (b) a handle mounted to the at least one eccentric cam, the handle being structured to enable manual displacement of the latch device radially outwardly relative to the outer member and clear of the path of the inner member.

9. A latching mechanism as defined in claim 6, wherein the biasing mechanism includes a spring captured in a cavity in the latch device.

10. A latching mechanism as defined in claim 6, further comprising:
   (a) a latching portion structured to automatically and releasably retain the at least one tow bar leg in a stored configuration, the latching portion including:
      (1) a plunger extending forwardly from the proximal end of the inner member of the at least one tow bar leg, the plunger having a shaft with a tapered end and a peripheral ridge thereabout, and
      (2) a retainer secured to the outer member of the at least one tow bar leg near the proximal end thereof, the retainer including a resilient retaining mechanism structured to latchingly and releasably receive the plunger therethrough with the retaining mechanism spaced between the peripheral ridge of the plunger and the proximal end of the inner member.

\* \* \* \* \*